(12) United States Patent
Nishikawa

(10) Patent No.: US 7,417,938 B2
(45) Date of Patent: Aug. 26, 2008

(54) OPTICAL PICKUP APPARATUS INCLUDING COLLIMATOR LENS WITH FIRST LENS GROUP HAVING NEGATIVE POWER AND BEING FIXED AND SECOND LENS GROUP HAVING POSITIVE POWER AND BEING MOVABLE

(75) Inventor: Koichiro Nishikawa, Takasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 11/113,014

(22) Filed: Apr. 25, 2005

(65) Prior Publication Data
US 2005/0254394 A1 Nov. 17, 2005

(30) Foreign Application Priority Data
May 11, 2004 (JP) ............................. 2004-141191

(51) Int. Cl.
*G11B 7/00* (2006.01)
(52) U.S. Cl. ................................. 369/112.24; 369/44.23
(58) Field of Classification Search ....................... None
See application file for complete search history.

(56) References Cited

U.S. PATENT DOCUMENTS

| | | | |
|---|---|---|---|
| 6,108,139 A | 8/2000 | Takahashi | 359/719 |
| 6,590,851 B1 * | 7/2003 | Kim et al. | 369/112.01 |
| 6,876,501 B2 * | 4/2005 | Kimura et al. | 359/719 |
| 7,054,252 B2 * | 5/2006 | Sato et al. | 369/112.01 |
| 2001/0021146 A1 | 9/2001 | Kikuchi et al. | 369/44.23 |
| 2002/0150016 A1 | 10/2002 | Yasuda et al. | 369/53.22 |
| 2004/0085885 A1 | 5/2004 | Kikuchi et al. | 369/112.24 |
| 2005/0078574 A1 | 4/2005 | Wada et al. | 369/44.32 |
| 2005/0254394 A1 | 11/2005 | Nishikawa | 369/112.01 |

FOREIGN PATENT DOCUMENTS

| | | |
|---|---|---|
| EP | 1 154 417 A2 | 11/2001 |
| EP | 1 271 496 A2 | 1/2003 |
| EP | 1 341 167 A1 | 9/2003 |
| JP | 2001-216662 | 8/2001 |
| JP | 2002-236252 | 8/2002 |
| WO | WO 03/075266 A1 | 9/2003 |

OTHER PUBLICATIONS

Dec. 8, 2005 European Search Report in EP 05 25 2613.
Patent Abstracts of Japan, vol. 2000, No. 25, Apr. 12, 2001 (JP-A 2001-216662, Aug. 10, 2001).
Patent Abstracts of Japan, vol. 2002, No. 12, Dec. 12, 2002 (JP-A 2002-236252, Aug. 23, 2002).

* cited by examiner

*Primary Examiner*—Joseph Feild
*Assistant Examiner*—Peter Vincent Agustin
(74) *Attorney, Agent, or Firm*—Fitzpatrick, Cella, Harper & Scinto

(57) ABSTRACT

Provided is an optical pickup apparatus which has a function for correcting spherical aberration caused by a thickness error of a transparent substrate and which is sufficiently compact, wherein a collimator lens used in the apparatus is composed of two lens groups, an interval between the two lens groups is changeable, and therefore spherical aberration caused by the thickness error of the transparent substrate is corrected.

2 Claims, 2 Drawing Sheets

OPTICAL PICKUP APPARATUS INCLUDING COLLIMATOR LENS WITH FIRST LENS GROUP HAVING NEGATIVE POWER AND BEING FIXED AND SECOND LENS GROUP HAVING POSITIVE POWER AND BEING MOVABLE

BACKGROUND OF THE INVENTION

1. Field of the Invention

The present invention relates to an optical system of an optical pickup apparatus, and more particularly to an optical system for correcting spherical aberration.

2. Related Background Art

In recent years, in order to realize a high recording density of an optical disk apparatus, techniques for shortening a wavelength of a light source and increasing the NA of an objective lens have been actively researched. Commercialization of an apparatus using a 405 nm semiconductor laser and an objective lens having the NA of 0.85 is started.

When the short-wavelength light source and the high-NA objective lens are employed, there are the following fundamental problems:

(1) The optical disk apparatus is easily affected by the tilt of the disk;

(2) The optical disk apparatus is easily affected by a thickness error of a transparent substrate; and (3) The optical disk apparatus is easily affected by wavelength hop of the light source.

Among those, the problem (1) is solved by thinning the transparent substrate. For example, a thickness of the transparent substrate is set to about 100 μm.

In order to solve the problems (2) and (3), an attempt has been made to devise an optical system. For example, in order to prevent the wavelength hop of the light source in (3), there has been made an attempt to provide an additional chromatic aberration correction lens for producing chromatic aberration to cancel chromatic aberration caused in the objective lens.

With respect to the problem (2), there have been studied the following methods of canceling spherical aberration caused when the transparent substrate has a thickness error, for example, (a) a method of providing an additional beam expander composed of lenses and changing an interval between the lenses to produce spherical aberration for canceling the spherical aberration caused when the transparent substrate has a thickness error, and (b) a method of shifting a position of a collimator lens in an optical axis direction to produce spherical aberration for canceling the spherical aberration caused when the transparent substrate has a thickness error.

The above-mentioned techniques have been disclosed by, for example, Japanese Patent Application Laid-Open No. 2002-236252.

FIG. 4A shows the case where the beam expander is used. To explain it briefly, as shown in FIG. 4A, an expander 33 composed of a negative power lens 31 and a positive power lens 32 is provided on an optical path of a parallel light flux on the light incident side of the objective lens 35. An interval between the lens 31 and the lens 32 is changed according to a thickness error of a transparent substrate 36 of an optical disk to produce the spherical aberration.

FIG. 4B shows the case where the position of the collimator lens is shifted. A system as shown in FIG. 4B is used and a collimator lens 34 is moved along an optical axis according to the thickness error of the transparent substrate 36 of the optical disk to produce the spherical aberration.

However, the above-mentioned conventional cases have the following problems. That is, when an additional beam expander is employed, a size of an optical pickup apparatus is likely to increase because an additional optical element is provided.

When the position of the collimator lens is shifted, it is necessary to move the collimator lens over a given movable distance, which is about 10 times a focal depth thereof. For example, when the NA of the collimator lens is about 0.1 and the thickness error of the transparent substrate is nearly equal to ±7 μm, it is necessary to set a movable range of about ±1 mm. As a result, the size of the optical pickup apparatus is likely to increase.

SUMMARY OF THE INVENTION

It is an object of the present invention to provide an optical pickup apparatus which has a function for correcting spherical aberration caused by a thickness error of a transparent substrate and is sufficiently compact.

An optical pickup apparatus according to the present invention includes: a light source; a collimator lens for converting light emitted from the light source into a substantially parallel light flux, the collimator lens including two lens groups; an objective lens for condensing the parallel light flux to a recording surface of an optical recording medium including a transparent substrate; and a drive mechanism capable of changing an interval between the two lens groups to correct spherical aberration caused by a change in thickness of the transparent substrate.

DETAILED DESCRIPTION OF THE PREFERRED EMBODIMENTS

Hereinafter, a best mode for embodying the present invention will be described in detail with reference to the accompanying drawings.

First Embodiment

Figure 1:
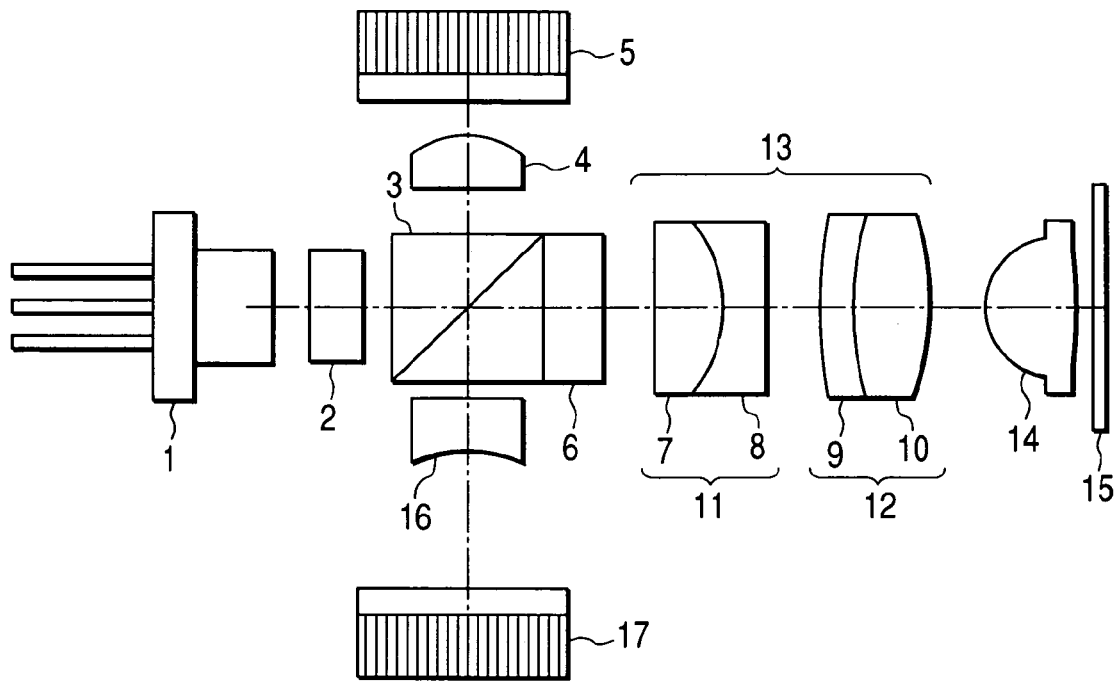
FIG. 1 is a view showing an optical system of an optical pickup apparatus according to the present invention.

FIG. 1 is a structural view showing an optical pickup apparatus according to a first embodiment of the present invention. In FIG. 1, a light beam emitted from a semiconductor laser 1 serving as a light source is separated into a main beam and two sub-beams by a diffractive grating 2. The sub-beams are used to generate serve signals for DPP (differential push-pull). The main beam is used to record information or reproduce recorded information.

A part of the light beams having passed through the diffractive grating 2 is reflected on a polarizing beam splitter (PBS) 3 and condensed to a monitor PD 5 by a condensing lens 4. An output of the monitor PD 5 is used to control emission power of the semiconductor laser 1.

A light beam having passed through the PBS 3 passes through a λ/4 plate 6 and is converted into a parallel light flux by a collimator lens 13. The parallel light flux passes through a transparent substrate and is imaged onto an information recording surface of an optical disk 15 by an objective lens 14. The optical disk 15 is composed of the transparent substrate and the information recording surface.

The collimator lens 13 includes two lens groups, that is, a first lens group 11 composed of spherical lenses 7 and 8 and a second lens group 12 composed of spherical lenses 9 and 10. An interval between the first lens group 11 and the second lens group 12 is changeable. The interval between the first and second lens groups is changed to correct spherical aberration. For example, this can be realized by driving the first lens group 11 and the second lens group 12 relative to each other in an optical axis direction using drive means such as a stepping motor.

A light beam reflected on the optical disk 15 passes through the objective lens 14, the collimator lens 13, and the λ/4 plate 6 again. Then, the light beam is reflected on the PBS 3 and condensed onto an RF servo PD 17 by a sensor lens 16. An information signal and the servo signals are obtained based on an output from the RF servo PD 17.

A wavelength of the semiconductor laser 1 for information reproduction is about 407 nm at room temperature. The NA of the objective lens 14 is 0.85 and a focal distance thereof is 1.1765 mm.

Table 1 shows design values of a projection system in this embodiment. Here, N(407) denotes a refractive index at a wavelength of 407 nm, and ΔN denotes a change in refractive index when the wavelength is increased by 1 nm and corresponds to dispersion in the vicinity of the wavelength of 407 nm. In addition, r denotes a lens curvature and d denotes a surface interval.

When a distance in the optical axis direction is given by X, a height in a direction perpendicular to the optical axis is given by h, and a conic coefficient is given by k, an aspherical shape of the objective lens is expressed by the following equation.

$$X = \frac{h^2/r}{1 + \sqrt{1 - (1+k)h^2/r^2}} + Bh^4 + Ch^6 + Dh^8 + Eh^{10} + Fh^{12} + Gh^{14}$$

Table 2 shows aspherical coefficients k and B to G.

TABLE 1

|   | Remarks | r | D | N(407) | ΔN |
|---|---------|---|---|--------|-----|
| 1 | LD | ∞ | 0.78 | | |
| 2 |  | ∞ | 0.25 | 1.52947 | −0.00008 |
| 3 |  | ∞ | 1.19 | | |
| 4 | Diffractive | ∞ | 1 | 1.52947 | −0.00008 |
| 5 | grating | ∞ | 1.6 | | |
| 6 | PBS | ∞ | 2.6 | 1.72840 | −0.00042 |
| 7 | λ/4 plate | ∞ | 1.15 | 1.56020 | −0.00020 |
| 8 |  | ∞ | 1.46 | | |
| 9 | Collimator | ∞ | 1.29 | 1.58345 | −0.00014 |
| 10 | lens | −2.28 | 0.71 | 1.80480 | −0.00053 |
| 11 |  | ∞ | 0.8 | | |
| 12 |  | 13.49 | 0.74 | 1.80480 | −0.00053 |
| 13 |  | 4.967 | 1.26 | 1.58345 | −0.00014 |
| 14 |  | −4.411 | 6.5 | | |
| 15 (Aspherical surface 1) | Objective lens | 0.89427 | 1.57 | 1.70930 | −0.00021 |
| 16 (Aspherical surface 2) |  | −3.38795 | 0.27 | | |
| 17 | Transparent | ∞ | 0.08 | 1.62068 | −0.00038 |
| 18 | substrate | ∞ | 0 | | |

TABLE 2

| Aspherical surface coefficient | Aspherical surface 1 | Aspherical surface 2 |
|---|---|---|
| k | −4.71569E−01 | −8.03122E+02 |
| B | 1.85624E−02 | 6.93685E−01 |
| C | −3.32437E−03 | −7.23881E−01 |
| D | 2.00843E−02 | −1.08028E+01 |
| E | −2.46799E−02 | 5.02375E+01 |
| F | 3.71610E−02 | −6.88792E+01 |
| G | −2.00730E−02 | 0 |

As is apparent from Table 1, the collimator lens 13 is composed of only the spherical lenses and becomes an optical element which is easily manufactured at low cost.

Next, the case where the transparent substrate of the optical disk 15 has a thickness error will be described. When the transparent substrate has the thickness error, spherical aberration is caused as known up to now. In particular, when a short-wavelength and high-NA objective lens is used, the influence of the spherical aberration is large.

Figure 2:
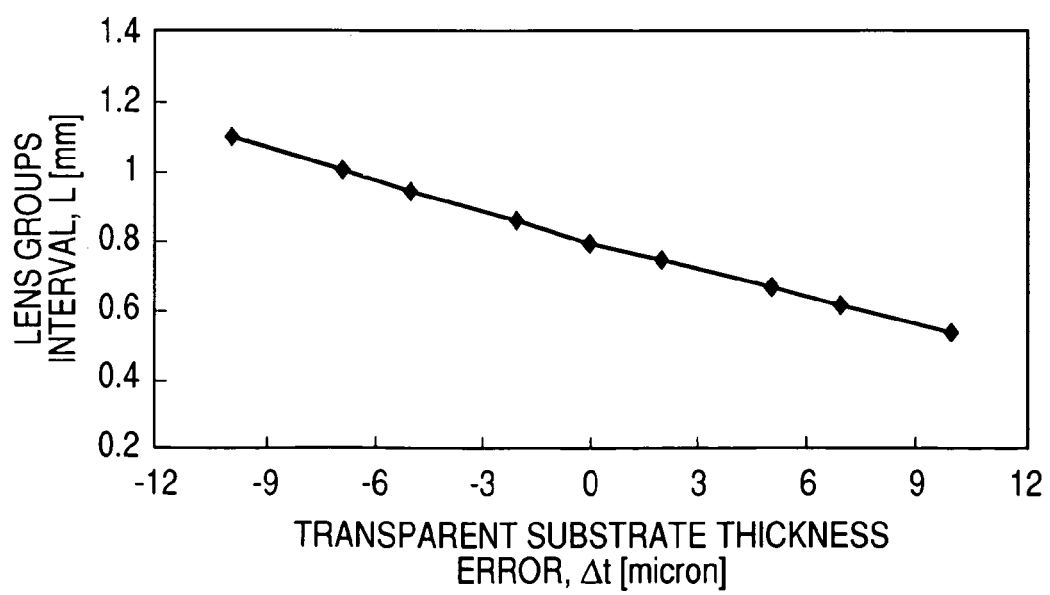
FIG. 2 is a graph showing a relationship between a thickness error of a transparent substrate and a distance between lens groups for correcting the thickness error in the case where a first lens group is moved.

Therefore, in the optical system according to this embodiment, the interval between the first lens group 11 and the second lens group 12 in the collimator lens 13 is changed to correct the caused spherical aberration. FIG. 2 shows a relationship between the thickness error of the transparent substrate and a distance between the lens groups for correcting the thickness error.

FIG. 2 shows a relationship in the case where the first lens group 11 is moved. The second lens group 12 is fixed. As is apparent from FIG. 2, a moving distance per μm of thickness error of the transparent substrate is about 28 μm.

Figure 3:
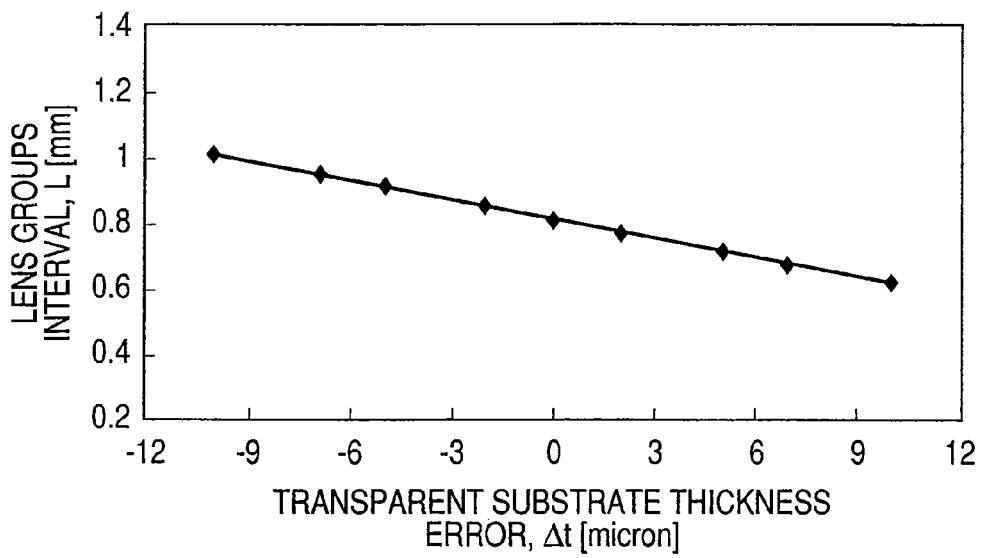
FIG. 3 is a graph showing a relationship between the thickness error of the transparent substrate and the distance between the lens groups for correcting the thickness error in the case where a second lens group is moved.
Figure 4A:
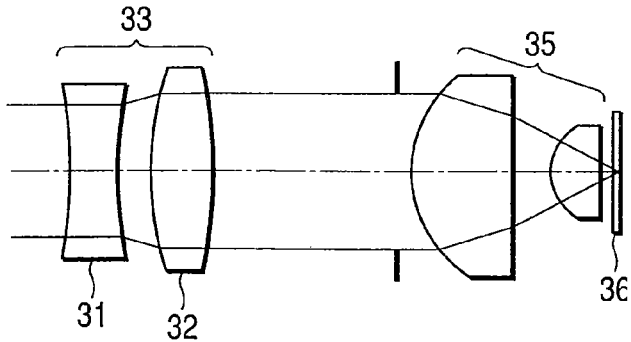
FIGS. 4A and 4B are explanatory views showing a conventional spherical aberration correcting method.
Figure 4B:
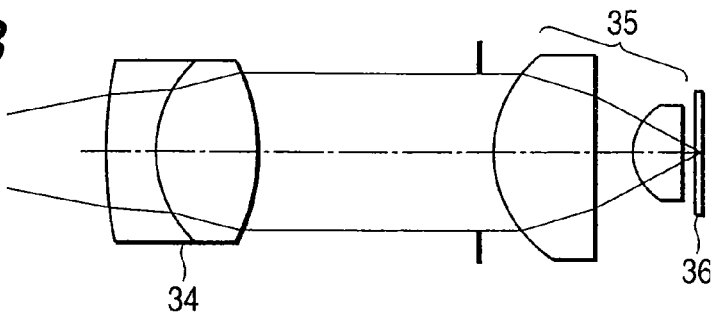

FIG. 3 is a graph showing a relationship between the thickness error of the transparent substrate and the interval between the lens groups for correcting the thickness error in the case where the second lens group 12 is moved. The first lens group 11 is fixed. In this case, a moving distance per μm of thickness error of the transparent substrate is about 20 μm. For example, when the entire collimator lens 13 is moved as in the conventional case, a moving distance per μm of thickness error of the transparent substrate is about 50 μm.

In this embodiment, when the first lens group 11 is moved, the entire length of the optical system does not change. Even when the second lens group 12 is moved, a range required for movement is about half that in the conventional case, which is sufficiently short. Therefore, a compact optical system can be constructed.

As is apparent from FIG. 1 and Table 1, the first lens group 11 is a lens group having negative power (focal distance is about −10.3 mm) and the second lens group 12 is a lens group having positive power (focal distance is about 7.0 mm). As a result, the collimator lens 13 becomes a telephoto system. Therefore, a distance between the semiconductor laser 1 and the collimator lens 13 can be shortened to realize a compact optical system.

Next, the case where the wavelength of the semiconductor laser 1 changes will be described. A problem arises in the case where focus servo control cannot be performed in keeping with an operation change, which corresponds to, for example, the time immediately after operation is shifted from reproduction to recording. When the wavelength relatively slowly changes, defocus caused by a change in wavelength is canceled by focus servo.

A wavelength shift when operation is shifted from reproduction to recording is about 1 nm in the case of a blue-violet semiconductor laser and the wavelength generally lengthens.

At this time, in the case of the objective lens shown in Table 1, when the wavelength is lengthened by 1 nm, the refractive index reduces. The positive power of the objective lens reduces to lengthen the focal distance, with the result that defocus of 0.243 μm is caused. When NA is 0.85 and the wavelength is 407 nm, the focal depth is about 0.28 μm. Therefore, when the wavelength shift is 2 nm, defocus that significantly exceeds the focal depth takes place, so that such a case is not suitable for recording/reproduction of information.

Thus, as shown in Table 1, with respect to the collimator lens 13 in this embodiment, the first lens group 11 is composed of the lens 7 having relatively low dispersion and positive power and the lens 8 having relatively high dispersion and negative power. The second lens group 12 is composed of the lens 9 having relatively high dispersion and negative power and the lens 10 having relatively low dispersion and positive power. When the wavelength lengthens, the refractive index is changed to reduce the negative power of the first lens group 11 and increase the positive power of the second lens group 12.

In particular, when the lens group having the positive power is made of a single glass material or composed of a single lens, the positive power becomes smaller as the wavelength lengthens. Therefore, the defocus of the objective lens is increased to cause larger defocus.

On the other hand, in this embodiment, even in the case of the lens group having the positive power, the defocus of the objective lens which is caused by an increase in wavelength is to be canceled. In actuality, when the wavelength is shifted from 407 nm to 408 nm, the focal distance is changed from 6.9678 mm to 6.9676 mm. Therefore, the focal distance slightly shortens and the power becomes larger.

With respect to the lens group having the negative power, even when it is composed of a single lens, the negative power is reduced due to a change in refractive index. In this embodiment, the two lenses are used such that the degree of change becomes larger. Therefore, the defocus of the objective lens which is caused by the wavelength shift, that is, chromatic aberration is corrected.

Table 3 shows this result.

TABLE 3

| | Single objective lens | Entire system | Breakdown (extent of contribution) | |
| --- | --- | --- | --- | --- |
| | | | First group | Second group |
| Defocus amount | 0.24 μm | 0.14 μm | (0.09 μm) | (0.01 μm) |

As a result, even when the wavelength shift is 2 nm, the defocus amount is made smaller than the focal depth. Therefore, even during a period in which focus servo cannot follow the shift, the high recording/reproduction performance can be ensured.

Second Embodiment

Next, a second embodiment of the present invention will be described. Table 4 shows design values in the second embodiment and Table 5 shows a result of chromatic aberration correction. An optical system of an optical pickup apparatus according to this embodiment has the same structure as that shown in FIG. 1. An objective lens is also identical to that in the first embodiment.

TABLE 4

| | Remarks | R | d | N(407) | ΔN |
| --- | --- | --- | --- | --- | --- |
| 1 | LD | ∞ | 0.78 | | |
| 2 | | ∞ | 0.25 | 1.52947 | −0.00008 |
| 3 | | ∞ | 1.191 | | |
| 4 | Diffractive | ∞ | 1 | 1.52947 | −0.00008 |
| 5 | grating | ∞ | 1.605 | | |
| 6 | PBS | ∞ | 2.6 | 1.72840 | −0.00042 |
| 7 | λ/4 plate | ∞ | 1.15 | 1.56020 | −0.00020 |
| 8 | | ∞ | 1.46 | | |
| 9 | Collimator | 28.405 | 1.3 | 1.58345 | −0.00014 |
| 10 | lens | −2.4 | 0.7 | 1.86286 | −0.00055 |
| 11 | | ∞ | 0.8 | | |
| 12 | | 14.622 | 0.7 | 1.86286 | −0.00055 |
| 13 | | 5.398 | 1.3 | 1.58345 | −0.00014 |
| 14 | | −4.195 | 6.5 | | |
| 15 | Objective | 0.89427 | 1.57 | 1.70930 | −0.00021 |
| 16 | lens | −3.38795 | 0.27 | | |
| 17 | Transparent | ∞ | 0.08 | 1.62068 | −0.00038 |
| 18 | substrate | ∞ | 0 | | |

TABLE 5

| | Single objective lens | Entire system | Breakdown (extent of contribution) | |
| --- | --- | --- | --- | --- |
| | | | First group | Second group |
| Defocus amount | 0.24 μm | 0.12 μm | (0.11 μm) | (0.01 μm) |

In the second embodiment, a state of the spherical aberration correction is substantially the same as that in the first embodiment. However, the chromatic aberration correction is further improved. Therefore, the collimator lens is composed of the lens group having the positive power and the lens group having the negative power by combining spherical lenses which are easily manufactured. Thus, it is possible to provide an inexpensive and compact optical pickup apparatus that can correct spherical aberration and chromatic aberration.

This application claims priority from Japanese Patent Application No. 2004-141191 filed on May 11, 2004, which is hereby incorporated by reference herein.

What is claimed is:

1. An optical pickup apparatus, comprising:

a light source;

a collimator lens for converting light emitted from the light source into a substantially parallel light flux, the collimator lens including two lens groups;

an objective lens for condensing the parallel light flux to a recording surface of an optical recording medium including a transparent substrate; and a drive mechanism capable of changing an interval between the two lens groups to correct spherical aberration caused by a change in thickness of the transparent substrate, wherein a first lens group of the collimator lens has a negative power and a second lens group thereof has a positive power, wherein the second lens group having the positive power comprises a negative power lens and a positive power lens, wherein the negative power lens is made of a glass material having relatively high dispersion, and the positive power lens is made of a glass material having relatively low dispersion, wherein the first lens group has a negative power of a focus distance of −10.3 mm and exists at the light source side, wherein the second lens group has a positive power of a focus distance of 7.0 mm and exists at the objective lens side, and wherein the first lens group is fixed, and the second lens group is movable, the moving distance of which, per micrometer of thickness error of the transparent substrate, is 20 micrometers.

2. An optical pickup apparatus according to claim 1, wherein the two lens groups of the collimator lens are composed of at least three spherical lenses.

* * * * *